United States Patent [19]
Yamanaka et al.

[11] Patent Number: 6,002,425
[45] Date of Patent: Dec. 14, 1999

[54] ALL PIXELS READ TYPE ELECTRONIC ENDOSCOPE SYSTEM

[75] Inventors: Kazuhiro Yamanaka; Mitsuru Higuchi, both of Omiya, Japan

[73] Assignee: Fuji Photo Optical Co., Ltd., Saitama, Japan

[21] Appl. No.: 08/921,661

[22] Filed: Sep. 2, 1997

[30] Foreign Application Priority Data

| Sep. 12, 1996 | [JP] | Japan | 8-263475 |
| Sep. 12, 1996 | [JP] | Japan | 8-263476 |
| Sep. 17, 1996 | [JP] | Japan | 8-263925 |
| Sep. 17, 1996 | [JP] | Japan | 8-267926 |

[51] Int. Cl.$^6$ .............. A61B 1/04; A61B 1/06; H04N 7/18
[52] U.S. Cl. ................. 348/68; 348/69; 348/70
[58] Field of Search ................ 348/65, 68, 69, 348/70; H04N 7/18

[56] References Cited

U.S. PATENT DOCUMENTS 5,233,416  8/1993  Inoue ........................... 348/70

*Primary Examiner*—Howard Britton
*Attorney, Agent, or Firm*—Snider & Associates; Ronald R. Snider

[57] ABSTRACT

This all pixels read type electronic endoscope system is to read out all the pixels obtained by one exposure in an image pickup device, thereby to improve the picture quality. In this system, a CCD and a CCD driver circuit are provided, and with respect to the video signals obtained by one exposure within a 1/60 sec period, the signals of odd lines are read out in the next period and then the signals of even lines are read out in the period subsequent to the next period, and the signal data of odd line is stored in a first memory, while the signal data of even lines is stored in a second memory. The reading of the even line data is enabled by a light interception by a light chopper. And, in a mixing circuit, the pixel data of odd and even lines are mixed together, and an image for one frame is formed based on the pixel mix signal. With this, the image signals of odd and even lines which are obtained in the same exposure can be read out without increasing the clock frequency, and a high-quality image can be obtained particularly in a freeze-frame picture. Further, if a delay memory is used, high quality can be achieved also for a motion picture, and in addition, the reading of image signals can also be performed at a double speed.

9 Claims, 14 Drawing Sheets

FIG. 2
(A)
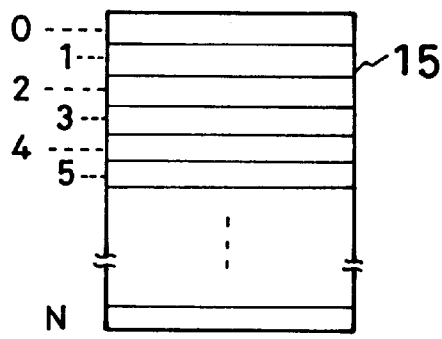
(B)     (C)
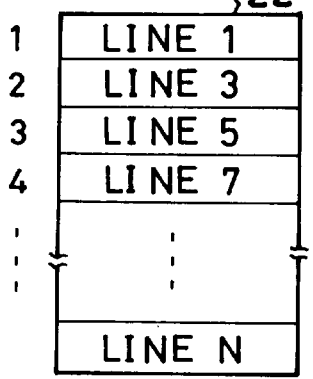 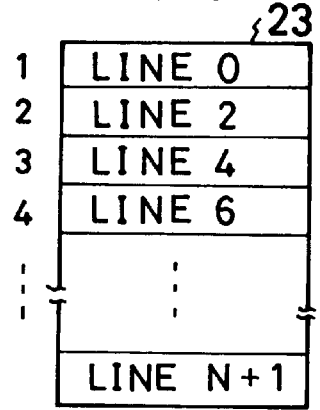
(C1)
(D)     (E)
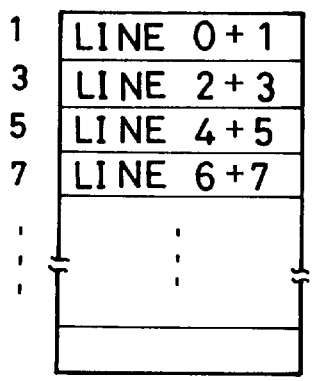 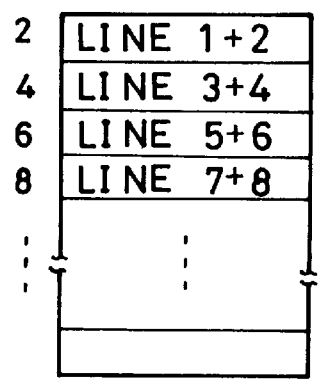
(Odd FIELD)     (Even FIELD)

ALL PIXELS READ TYPE ELECTRONIC ENDOSCOPE SYSTEM

BACKGROUND OF THE INVENTION

This application claims the priority of Japanese Patent Applications Nos. 8-263475 and 8-263476 filed on Sept. 12, 1996, Nos. 8-267925 and 8-267926 filed on Sept. 17, 1996, which are incorporated herein by reference.

1. Field of the Invention

The present invention relates to an electronic endoscope system, and particularly to the signal-processing for an endoscope system in which the all pixels of an image stored in an image pickup device by one exposure are read out to form an image of high quality.

2. Description of the Prior Art

In the electronic endoscope system, a device such as a CCD (Charge Coupled Device) is used as the image pickup device, and in the CCD, an image signal (video signal) is obtained by reading out the charges stored by an optoelectric transducer on a pixel basis. And, in the simultaneous electronic endoscope system, color filters are placed on the upper surface of the CCD for each pixel, thereby to obtain a color image.

In FIG. 17(A), the arrangement of the above color filters is shown, and on the image pickup surface of a CCD 1, Mg (magenta), G (green), Cy (cyan), and Ye (yellow), for instance, are arranged on a pixel basis as shown. Accordingly, by a light passing through these color filters, stored charges are obtained in the CCD 1.

FIG. 17(B) shows the reading by the conventional 2-line mixed reading method, in which the stored charges of the pixels in the upper and lower lines are mixed and read out. For instance, in the first exposure, odd field video signals such as a mixed signal of line 0 and line 1, a mixed signal of line 2 and line 3 . . . are read out, and in the second exposure, even field video signals such as a mixed signal of line 1 and line 2, a mixed signal of line 3 and line 4 . . . are read out. Accordingly, the mixed signals of two lines of the CCD 1 become the signal of one line of a field image.

In FIG. 18, the signal read operation in the above CCD 1 is shown, and as shown by the field O/E signal of (A) of the same figure, odd and even fields are obtained for each 1/60 sec (vertical synchronizing period). For this, in the above period of 1/60 sec, a signal storing is performed, for instance, by the storage (exposure) time t of an electronic shutter shown in (B) of the same figure, and in the next period of 1/60 sec, the stored mixed signals are read out. As a result, as shown in (C) of the same figure, the odd field signal of n−1 (number) and the even field signal of n are obtained. The odd field signal of n−1 is made up of the mixed signals of line (0+1), line (2+3), line (4+5) . . . which are shown on the left portion of FIG. 17 (B), and the even field signal of n is made up of line (1+2), line (3+4) . . . which are shown on the right portion of FIG. 17(B).

Then, the odd field signal and even field signal are subjected to an interlaced scan to form an image for one frame, and this image is displayed on a monitor. Of course, during the above process, various signal processings are performed to form color difference signals and brightness signals from the above mixed signals, and based on these signals, the image of the inside of a subject to be observed is displayed on the monitor.

SUMMARY OF THE INVENTION

However, in the above described simultaneous electronic endoscope system, these is a time lag of 1/60 sec between the odd field image and the even field image for forming an image for one frame, as shown in FIG. 18(C), and thus there is a problem that the picture quality degrades if the endoscope itself shakes or the subject moves during that time period. Particularly in the endoscope, a freeze-frame picture is displayed by operating a freeze switch, by which a specific portion to be observed can be observed in detail. Also in the freeze-frame picture, an image for one frame is displayed based on the above odd field information and even field information, and the difference (lag or movement) between both information would cause degradation (including color drift) in the picture quality.

Further, in the electronic endoscope system, sometimes an electric shutter function is employed for changing the storage time of signals, and according to this, the picture quality can be improved by shortening the storage time in a bright place. However, as shown in FIG. 18(B), there is a time lag of 1/60 sec between two store operations (exposures) to form a one-frame image, and thus there is also a disadvantage that the effect of shortening the storage time can not always be enjoyed.

Further, it was also proposed to sequentially read all pixels during the period of 1/60 sec. However, in this case, there is a disadvantage that the construction becomes complicated because the structure of the transfer line (vertical CCD) of the above CCD 1 must be formed with a double density.

The present invention was made in view of the above problems, and it is the first object of the present invention to provide an all pixels read type electronic endoscope system in which all the pixels obtained in an image pickup device by one exposure are read out without increasing the clock frequency, whereby the picture quality can be improved particularly in freeze-frame pictures.

It is the second object of the present invention to provide an all pixels read type electronic endoscope system in which the picture quality can be improved not only in freeze-frame pictures but also in motion pictures.

It is the third object of the present invention to provide an all pixels read type system which can improve the delay in image display which occurs when odd line data and even line data are sequentially stored in dedicated memories in the above all pixels reading.

It is the fourth object of the present invention to provide an electronic endoscope system which enables the system employing the above all pixels reading method to be used along with the conventional system.

To accomplish the above first object, the all pixels read type electronic endoscope system related to the present invention comprises an image pickup device circuit for performing a control so that, with respect to the image signals stored for each pixel by one exposure in the image pickup device, the image signals of either odd or even lines are read out first and then the image signals of the remaining lines are read out, and a light intercepting means for intercepting the illumination light so as to prevent pixel signals from being stored in the image pickup device during a predetermined time period in which image signals are read out in the image pickup device driver circuit, whereby an image is formed by the image pickup device driver circuit based on the image signals obtained in the image pickup device.

Further, a more specific invention comprises an image pickup device in which a plurality of color filters are arranged on a pixel basis, an image pickup device driver circuit for performing a control so that, with respect to the image signals stored for each pixel by one exposure in the image pickup device, the image signals of either odd or even lines are read out first and then the image signals of the remaining lines are read out, a light intercepting means for intercepting the illumination light so as to prevent image signals from being stored in the image pickup device during a predetermined time period in which image signals are read out in the image pickup device driver circuit, memories for storing the image signals of odd lines and the image signals of even lines which are obtained from the image pickup device, and a mixing circuit for mixing the image signals of odd and even lines which are read out from the memories, thereby to form a simultaneous image signal, whereby a field image is formed based on the pixel mix signals outputted from the mixing circuit.

In accordance with this invention, for instance, with respect to the charges stored by an exposure (exposure time is arbitrary) within the first period (vertical synchronizing period) of $1/60$ sec, the odd lines of the image pickup device (CCD) are read out (from transfer lines) in the second $1/60$ sec period, and the remaining even lines are read out in the third $1/60$ sec period (in the next exposure). And, to read out the even lines, the light from a light source for the second period is intercepted by the light intercepting means. That is, if the charges by the next exposure are stored during the second period in which the stored charges of the odd lines are sequentially read out, as in the prior art, the reading of the remaining even lines cannot be performed. Thus, in the present invention, no optical output is provided in the second period and the stored charges of even lines can be read out in the third period, thereby to enable the reading of the signals for the all pixels of the image pickup device which are obtained by one exposure.

Then, the video signals of the odd and even lines are respectively stored in the memories, and thereafter the respective lines are simultaneously read and a pixel mixing is performed in the mixing circuit. That is, pixel mix signals are formed by the same method as the above 2-line mixed reading method, and the video signals of odd field data and even field data are formed. The video signals are subjected to the same processing as the conventional one, and thereafter outputted to a monitor or the like. Thus, based on the signals of the all pixels which are obtained by one exposure during a $1/60$ sec period, an image for one frame is formed, whereby a high-quality image can be obtained.

When a freeze-frame image is formed in the above arrangement, control is preferably made so as to store in the above memories only the image signals of odd and even lines which are obtained in the same exposure.

In accordance with this, when the freeze switch is pressed, the writing to the memories is inhibited at a point of time when the image signals of odd and even lines obtained in the same exposure are stored in the memories. Accordingly, a freeze-frame image is always displayed by the video signals obtained by the same exposure within a $1/60$ sec period, enabling a high-quality freeze-frame image to be observed.

To accomplish the above second object, a further invention includes a delay memory for delaying the image signals of the even or odd lines, which are previously stored in the above memories, by a predetermined time, and in the above mixing circuit, the above image signals of the odd and even lines in the same exposure, which are read out from the above image memories and delay memory, are mixed together to form an image signal.

In accordance with this invention, of the video signals of the odd and even lines which are stored in the above image memories, the video signals of the first stored, for instance, odd lines are further stored in the delay memory so as to be delayed by $1/60$ sec. With this, all the signals of both lines which are obtained in the same exposure can be simultaneously read out from each memory. Accordingly, based only on the signals of the all pixels which are obtained by one exposure, an image for one frame is formed, and thus a high-quality image can also be displayed in the motion picture.

To accomplish the above third object, a further invention comprises, as the above image pickup device driver circuit, a double speed read control circuit for performing the reading of both image signals of the odd and even lines at a speed two times as fast as the memory reading speed within a light interception period in which light is intercepted by the above light intercepting means.

That is, since image signals are once stored in the above image memories in the above all pixels reading method, the signal processing delays by $1/30$ sec corresponding to the time taken to form two fields, as compared with the prior art, until a pixel mix signal similar to the prior art is obtained. Thus, in this invention, the speed of the reading from the above image pickup device is doubled, thereby to shorten the delay time to $1/60$ sec, which is the time required to form one field.

To accomplish the above fourth object, a further invention comprises, in the light source unit, a light intercepting means for intercepting the illumination light with a predetermined timing so as to prevent pixel signals from being stored in the image pickup device, and a switching means for switching the enabling/disabling of the light intercepting means, whereby an electronic endoscope employing the all pixels read method in which with respect to the image signals stored for each pixel by one exposure in the above image pickup device, the image signals of either odd or even lines are read out first and then the image signals of the remaining lines are read out, and an electronic endoscope of the conventional reading method are both made connectible to the processor unit and the light source unit.

Further, in the above invention, the processor unit can be provided with a through-line for outputting signals without passing through the above memories necessary for reading out the all pixels and the mixing circuit provided in the stage after the memories, and a switching circuit for switching the above memories and the mixing circuit, and the trough line, whereby both the electronic endoscope of the all pixels read type and the electronic endoscope of the conventional reading type are allowed to be connected to the processor unit and the light source unit.

Further, the above processor unit can also be provided with a all pixels read control circuit for reading out all the pixels obtained by one exposure by the above described technique, and a switching circuit for switching the all pixels read control circuit and the conventional read circuit, whereby both the electronic endoscope of the all pixels read type and the electronic endoscope of the conventional reading type are made connectable to the processor unit and the light source unit.

In the foregoing, preferably, identification information is provided to various type of electronic endoscope employing the all pixels read method and the conventional electronic endoscope, and a predetermined switching is performed by automatically identifying the identification information in the processor unit.

That is, in accordance with the above invention, by setting the type of an electronic endoscope by the identification information provided to the electronic endoscope or by the operation panel of the processor, a switching as to whether or not the light intercepting means is to be used is performed in the light source unit. In addition, in the processor unit, a switching as to whether or not the memories and mixing circuit necessary for the all pixels read method are used, or a switching as to whether or not the all pixels read control circuit is used is performed, whereby both the electronic endoscope equipped with the circuits necessary for the all pixels read method and the old-type electronic endoscope are allowed to be used.

BRIEF DESCRIPTION OF THE DRAWING

FIG. 2 is a figure showing image data which is read out in the stage from the CCD to the mixing circuit in FIG. 1;

DESCRIPTION OF THE PREFERRED EMBODIMENTS

First Embodiment

Figure 1:
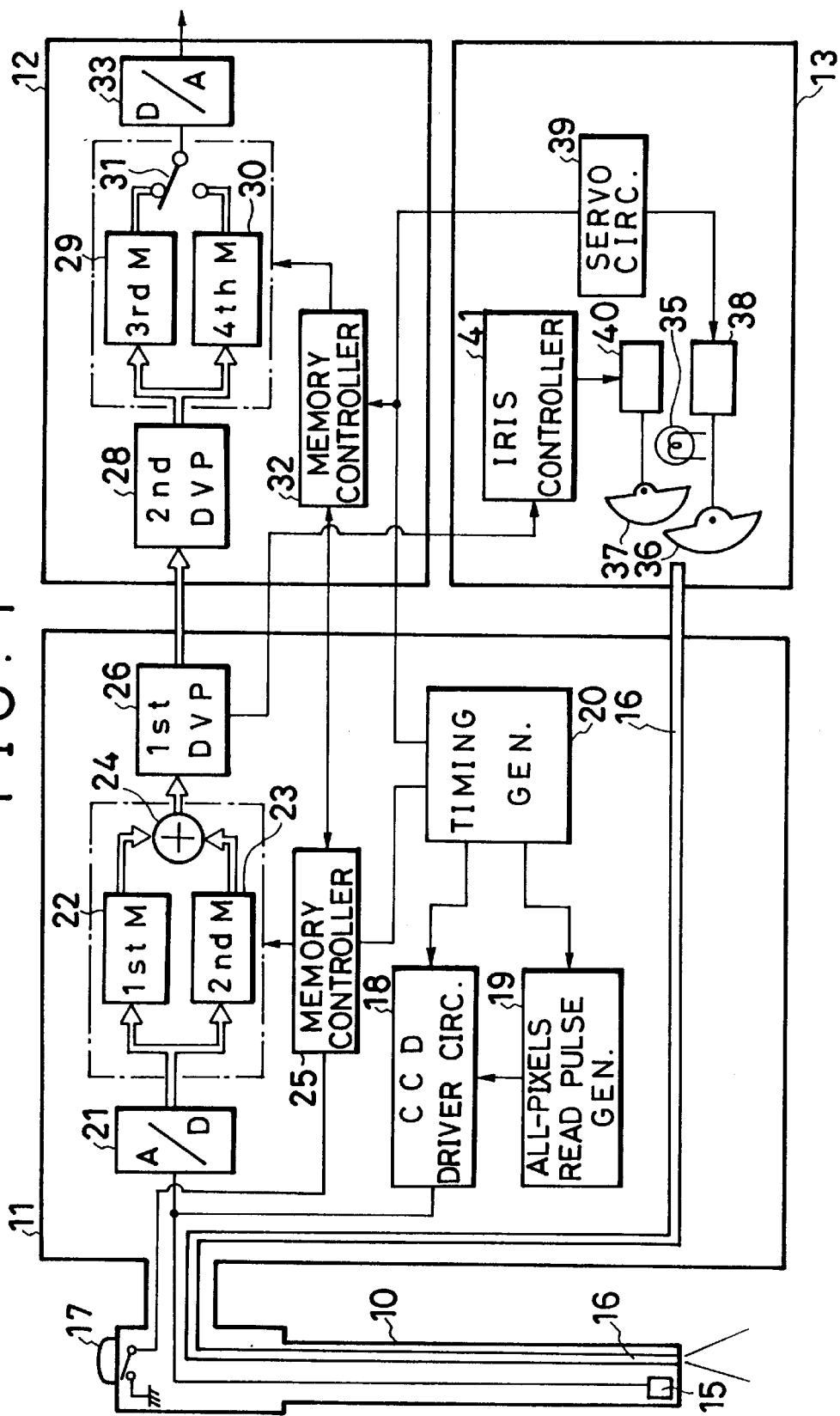
FIG. 1 is a block diagram showing the circuit construction of the all pixels read type electronic endoscope system related to the first embodiment of the present invention.
Figure 17A:
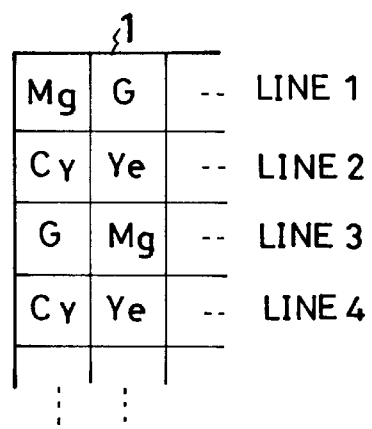
FIG. 17A is a figure showing the construction of the color filters in the conventional CCD.

In FIG. 1, the circuit construction of the all pixels read type electronic endoscope system is shown as an example of the embodiment, and as shown, the electronic endoscope system comprises an electronic endoscope 10 as a scope, a connector circuit 11 of the electronic endoscope (a circuit within the electronic endoscope), a processor unit 12, and a light source unit 13. In the above electronic endoscope 10, a CCD15 provided with color filters similar to those described in FIG. 17(A) is provided in the tip portion thereof, and a light guide 16 for guiding the light of the light source unit 13 to the tip portion is disposed. Further, in the operation unit of the electronic endoscope 10, a freeze switch 17 for displaying freeze-frame pictures is provided.

In the connector circuit 11, a CCD driver circuit 18 for driving the CCD 15, a all pixels read pulse generator circuit 19, and a timing generator 20 are provided. The all pixels read pulse generator circuit 19 generates, based on the signal of the timing generator 20, a pulse to read out the stored data for all the pixels stored in the CCD 15 by one exposure separately for odd lines and even lines, and supplies it to the CCD driver circuit 18. The CCD driver circuit 18 performs a control for independently sequentially reading out the signals of the odd lines and the signals of the even lines from the CCD 15 based on the above read pulse.

Further, there are provided an A/D converter 21 to which the output signal of the CCD 15 is inputted, a first memory 22 for storing, for instance, the image data of odd lines, a second memory 23 for storing the image data of even lines, a mixing circuit 24, and a memory control circuit 25. That is, the video signals outputted from the CCD 15 are not outputted by two lines mixing as in the prior art, but they are divided into the video signals of odd lines and the video signals of even lines based on the control of the memory, control circuit 25 and once stored in the respective memories 22 and 23. Thereafter, the mixing circuit 24 adds and mixes the data of odd lines and the data of even lines to form a signal equivalent to the conventional 2-line mixed read method.

FIG. 2 shows the contents of the image data formed in the circuits from the above described CCD 15 to the mixing circuit 24. As shown in (A) of the same figure, in the CCD 15, horizontal lines from line 0 to line N are provided correspondingly to the number of scan lines, and the pixel data of the horizontal lines is transferred to transfer lines and read out. And, the data of the odd lines (lines 1, 3, 5 ... ) of the CCD 15 is stored in the first memory 22 of (B) of the same figure, and the data of the even lines (lines 2, 4, 6 ... ) is stored in the second memory 23 of (C) of the same figure.

With respect to the data of these memories 22 and 23, a pixel mixing is performed between the lines of (B) and (C) of the same figure by the mixing circuit 24, and as shown in (D) of the same figure, the add operation data such as line 0+line 1, line 2+line 3, line 4+line 5 ... is outputted as an odd field data. Further, a pixel mixing is performed between the lines of (B) of the same figure with the read line of (C) of the same figure being downwardly by one line, (read out in the position of C1 shown.) and as shown in (E) of the same figure, the add operation data such as line 1+line 2, line 3+line 4, line 5+line 6 ... is outputted as an even field data. For discrimination, the oddness of the lines of the CCD 15 is designated as ODD, the evenness of those lines is designated as EVEN, and the oddness and evenness of the fields to be subjected to an interlaced scan are designated as Odd and Even, respectively.

Further, in FIG. 1, a first DVP (Digital Video Processor) 26 is provided after the mixing circuit 24, and in the first DVP 26, the color signal processing of the pixel mixing read is performed to form, for instance, a color difference signal and a brightness signal. In addition, an automatic gain control circuit, a gamma processing circuit and the like are further disposed at proper positions, though not shown.

In the processor unit 12 to which the electronic endoscope 10 is connected, a second DVP 28 connected to the first DVP 26 is provided, and in the second DVP 28, an image position control, a magnification processing, a mirror image processing and the like are performed. After the second DVP 28, there are provided a third memory 29 for storing odd field data, a fourth memory 30 for storing even field data, a switching circuit 31, a memory control circuit 32, and a D/A converter 33. That is, in the third memory 29, the odd field data, in which the data of (D) of FIG. 2 was converted to a color difference signal or the like, is stored, and the fourth memory 30, the even field data, in which the data of (E) of FIG. 2 was converted to a color difference signal or the like is stored.

Further, in the light source unit 13 to which the light guide 16 disposed in the electronic endoscope 10 is connected, a light source 35 is provided, and between the light source 35 and the incidence end of the light guide 16, a light chopper 36 and a diaphragm 37 are provided. The light chopper 36 has a construction in which, for instance, a semicircular plate is rotated, and a driver circuit 38 and a servo circuit 39 are connected to cause the light chopper 36 to make one turn in 1/30 sec.

Accordingly, with this light chopper 36, at the field O/E signal of a 1/60 sec cycle, it is possible to output a light for 1/60 sec and intercept the light for the next 1/60 sec.

On the other hand, to the diaphragm 37, a driver circuit 40 and an iris control circuit 41 are connected, and the driver circuit 40 and the iris control circuit 41 can drive the diaphragm 37 based on the brightness signal obtained in the first DVP 26, thereby to adjust the quantity of the output light of the light source 35.

The first embodiment has the above construction, and its operation is described with reference to FIGS. 3 and 4. As shown in FIG. 4(A), as the field O (Odd)/E (Even) signal, a timing signal for forming one field in 1/60 sec is used as in the conventional system. In response to this, by causing the light chopper 36 to make one turn in 1/30 sec, light is repetitively outputted with a period of 1/60 sec while interlacing with light intercepted states of 1/60 sec, as shown by Pn-1, Pn, and Pn+1 of FIG. 4(B). This light is illuminated into the subject from the tip through the light guide 16.

By this light illumination, the image of the inside of the subject is captured in the CCD 15 in the tip, and charges corresponding to the image are stored in the CCD 15. The reading of the stored charges is performed by a control pulse from the CCD driver circuit 18, and if an electronic shutter function is used, it is only needed to change the timing of the storing or reading by the control pulse, whereby the charge storage time can be varied to adjust the exposure.

Then, in the first embodiment, by the control of the all pixels read pulse generator circuit 19, the stored data of the all pixels of the CCD 15 which was obtained by one exposure is read out. That is, as shown in FIG. 4(C), based on the exposure of the light output Pn-1 in FIG. 4(B), the odd (ODD) line data and even (EVEN) line data of n-1 are sequentially read out from the CCD 15, and the odd line data is stored in the first memory 22 by the write enable signal of FIG. 4(E) while the even line data is stored in the second memory 23 by the write enable signal of FIG. 4(F). Further, in the order of the light outputs Pn, Pn+1 . . . , the respective odd and even line data are read out and stored in the memories 22 and 23, respectively.

Then, the data in the memories 22 and 23 are subjected to a pixel mixing by the mixing circuit 24, and as shown in FIG.(G), field signals are sequentially formed such as an odd (Odd) field signal obtained by a mix processing between the odd line data and the even line data of n-2(-th), an even (Even) field signal obtained by a mix processing between the even line data of n-2 and the odd line data of n-1, an odd (Odd) field signal obtained by a mix processing between the odd line data and the even line data of n-1. And, these field signals are subjected to a color image processing and once stored in the third memory 29 and the fourth memory 30, and the outputs of the memories 29 and 30 are alternately provided to a monitor by a switching circuit 31 and an image display is provided by an interlaced scan.

Accordingly, in this example, as to motion pictures, an image including part of the image data obtained in the next exposure is displayed, but the amount of this data is ½ of the total, and even if there is a shake or movement during 1/60 sec, the effect of it is small.

Figure 3:
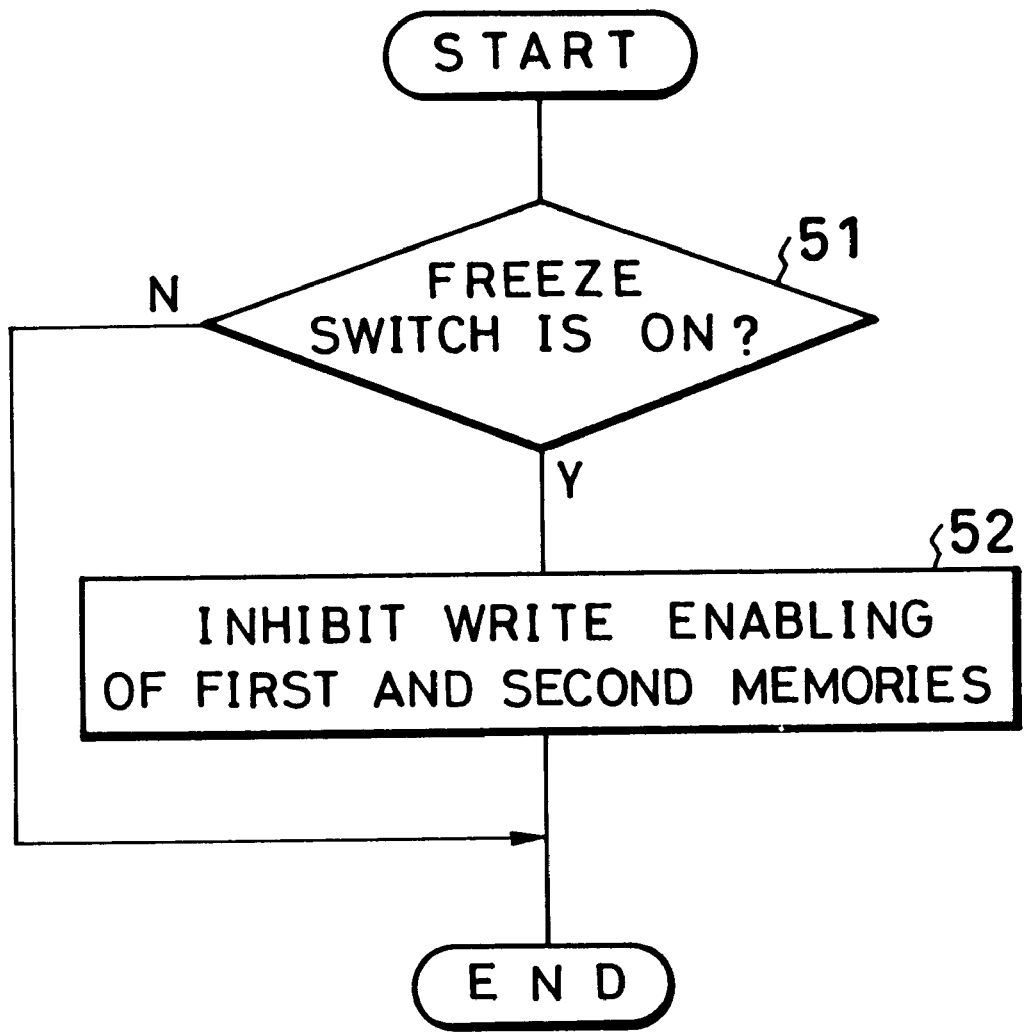
FIG. 3 is a flowchart showing the memory control operation in the first memory and the second memory.
Figure 4:
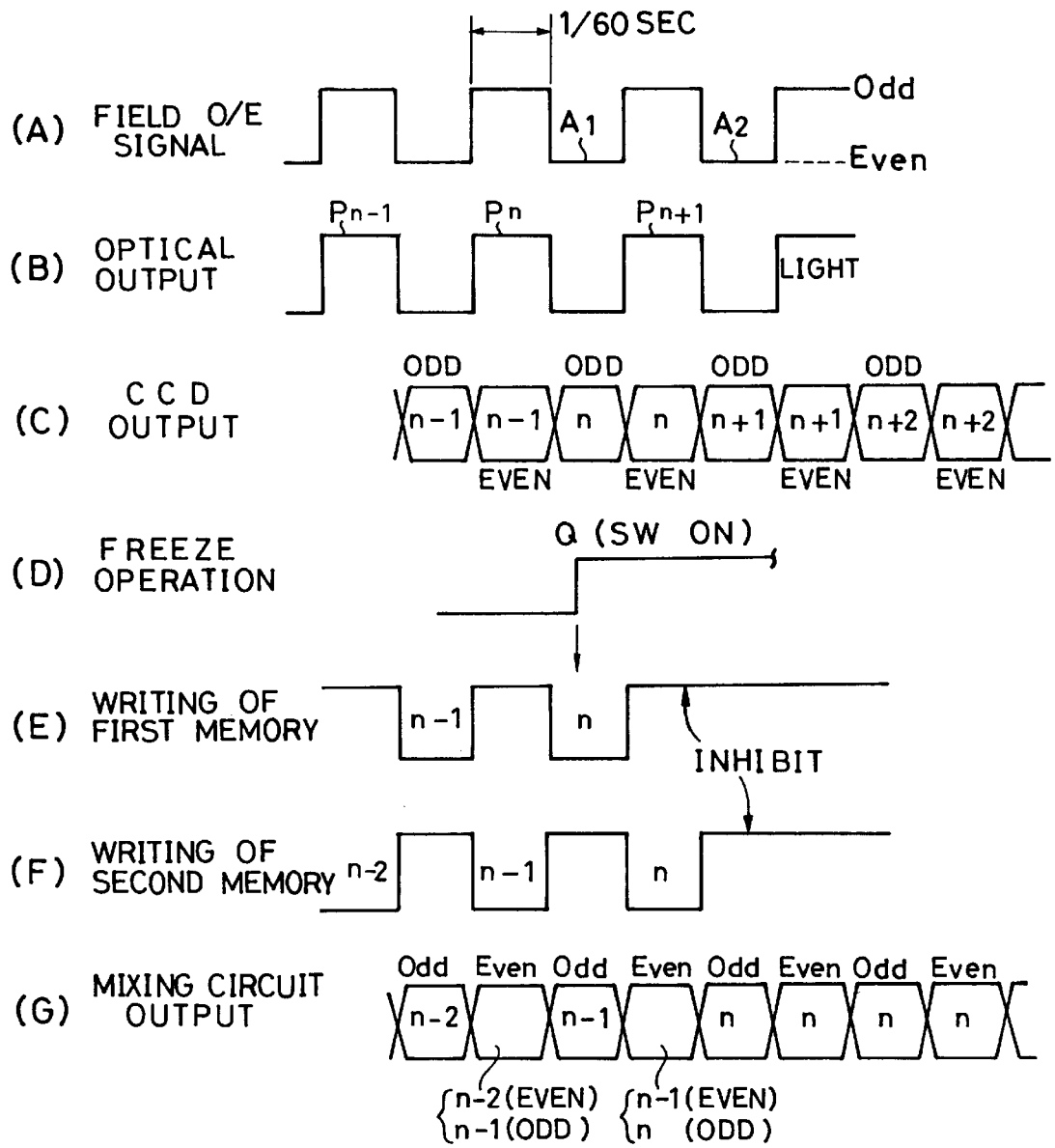
FIG. 4 is an explanatory view showing the main operations of the first embodiment.

On the other hand, as to freeze-frame pictures, the image display is provided using only the data in the same exposure, and in the memory control circuit 25 in FIG. 1 (or it may be a CPU or the like, not shown), the control operation of FIG. 3 is executed. That is, this control is set so as to execute each operation at the rise of the O/E signal of FIG. 4(A), and it is determined in step 101 whether or not the freeze-switch 17 is pressed (on), and if pressed, the write enabling of the first memory 22 and the second memory 23 is inhibited in step 102.

For instance, if the freeze switch 17 is turned on at the point Q shown in FIG. 4(D), the field O/E signal is at a fall (A1), and thus the writing of the respective memories 22 and 23 is inhibited at the next rise (A2) [FIG. 4(E), (F)]. Accordingly, to the first memory 22, the odd line data of n which was obtained by the optical output Pn is written, while to the second memory 23, the even line data of n is also written, and the next data is not written. As a result, as shown in FIG. 4(G), an odd (Odd) field signal and an even (Even) field signal which are comprised of the odd and even line data of the same n are sequentially read out, and these field signals are displayed as a freeze-frame picture by an interlaced scan.

Thus, the combination of the field images of different times is inhibited, and a freeze-frame image is displayed based on the data of the all pixels in the same exposure, whereby the observation of the high-quality image of the inside of a subject is enabled. In addition, even if the freeze switch 17 is pressed at another point of time, the next writing is always inhibited after the odd line data and even line data of the same number (such as n-1, n+1) are written.

In the above first embodiment, the electronic shutter function can be used in response to the brightness of the inside of the subject, as described above, the present invention has an advantage of further increasing the effect of the electronic shutter function. That is, since the screen becomes bright if the tip portion approaches affected part, the storage time in the CCD 15 can be shortened by the electronic shutter function to improve the picture quality, whereas in the conventional method, an image is formed based on the video signals obtained in two exposures, and thus the existence of a movement or shake between the two exposures has an effect on the picture quality. However, in the present invention, since a freeze-frame image is formed based on the video signal obtained in one exposure, the effect of the time of such one exposure, or of the shortening of the signal storage time directly appears, and thus there is an advantage that the quality improvement by the shortening of the exposure time is remarkable.

Further, in the endoscope, in consideration of a burn on the affected part, it is not preferred to give a strong illumination light to the affected part from the tip of the endoscope for a long time, and thus the intensity of the illumination light is restricted to some extent. However, in the present invention, since the output of the light becomes half as compared with the prior art, there is an advantage that the intensity of the illumination can also be increased to form an image which is easier to see.

As described above, in accordance with the first embodiment, all the pixels obtained in the image pickup device by one exposure can be read out without increasing the clock frequency, and the picture quality can be improved particularly in freeze-frame pictures. Further, there is also an advantage that the effect of the electronic shutter function can fully be exhibited and the illumination light intensity can be increased to further improve the picture quality.

Second Embodiment

Figure 5:
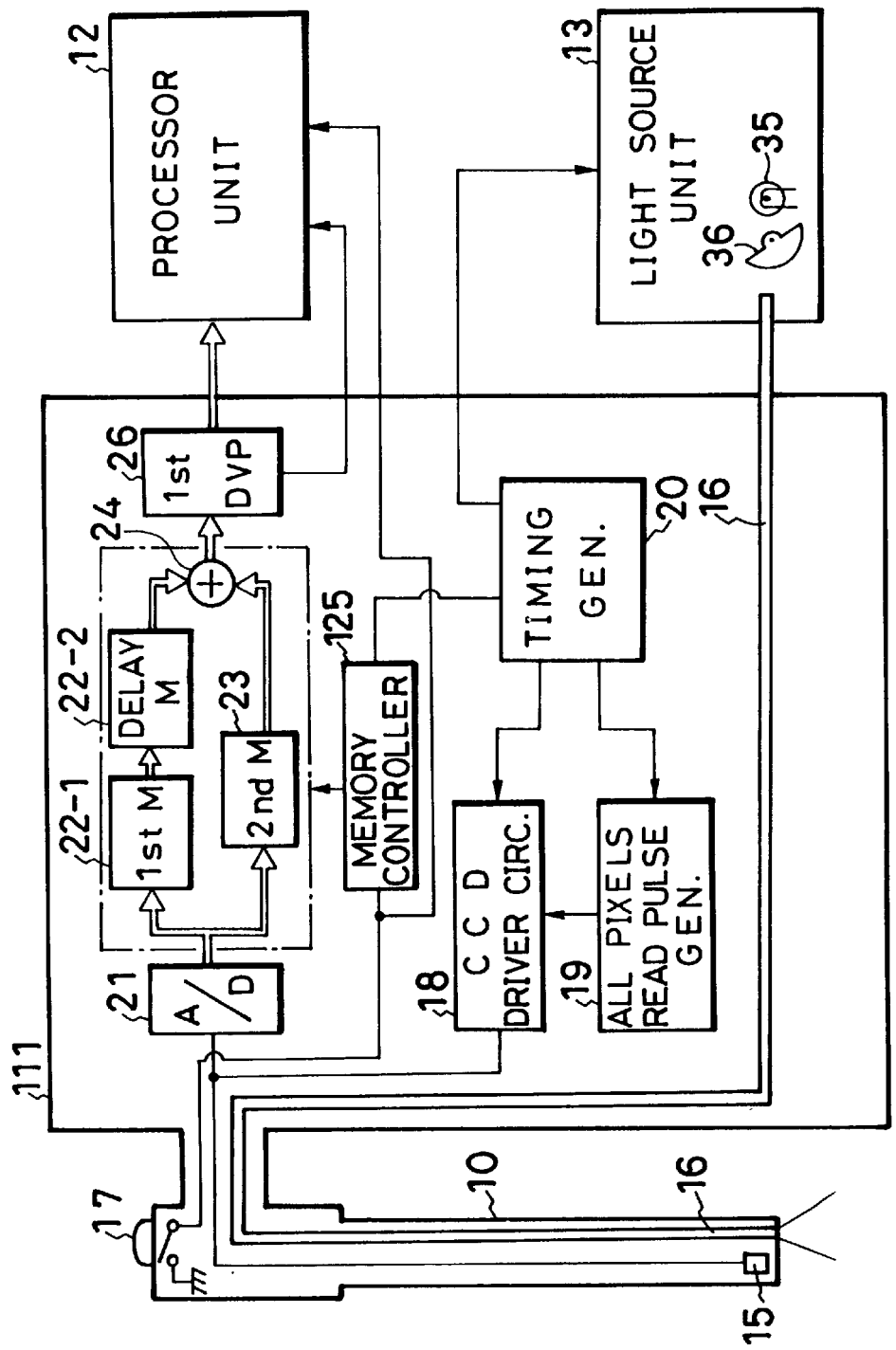
FIG. 5 is a block diagram showing the circuit construction of the all pixels read type electronic endoscope related to the second embodiment of the present invention.

FIG. 5 shows the circuit construction of the all pixels read type electronic endoscope system of the second embodiment, which uses a delay memory to obtain good images also for motion pictures. In FIG. 5, the basic construction of an electronic endoscope 10, a connector circuit 111, a processor unit 12, and a light source unit 13 is similar to the construction of the first embodiment. That is, in the connector circuit 111, there are provided, for instance, a first memory 122-1 for storing the image data of odd lines, a second memory 23 for storing the image data of even lines, a mixing circuit 24, and a memory control circuit 125.

And, after the first memory 122-1, there is provided a delay memory 122-2 for directly recording the image signal of the first memory 122-1 and delaying the read timing by 1/60 sec. Although detailed later, in accordance with the delay memory 122-2, the odd and even line data obtained in the same exposure can be stored for the same period for reading out data for two fields, thereby to enable the display of the motion picture or the like based on the all pixel data in the same exposure.

Thereafter, the mixing circuit 24 adds and mixes the odd line data and the even line data to form a signal equivalent to the conventional mixed read method. The contents of the process of the image data formed in the circuits from the CCD 15 to the mixing circuit 24 is similar to the above FIG. 2.

Figure 6:
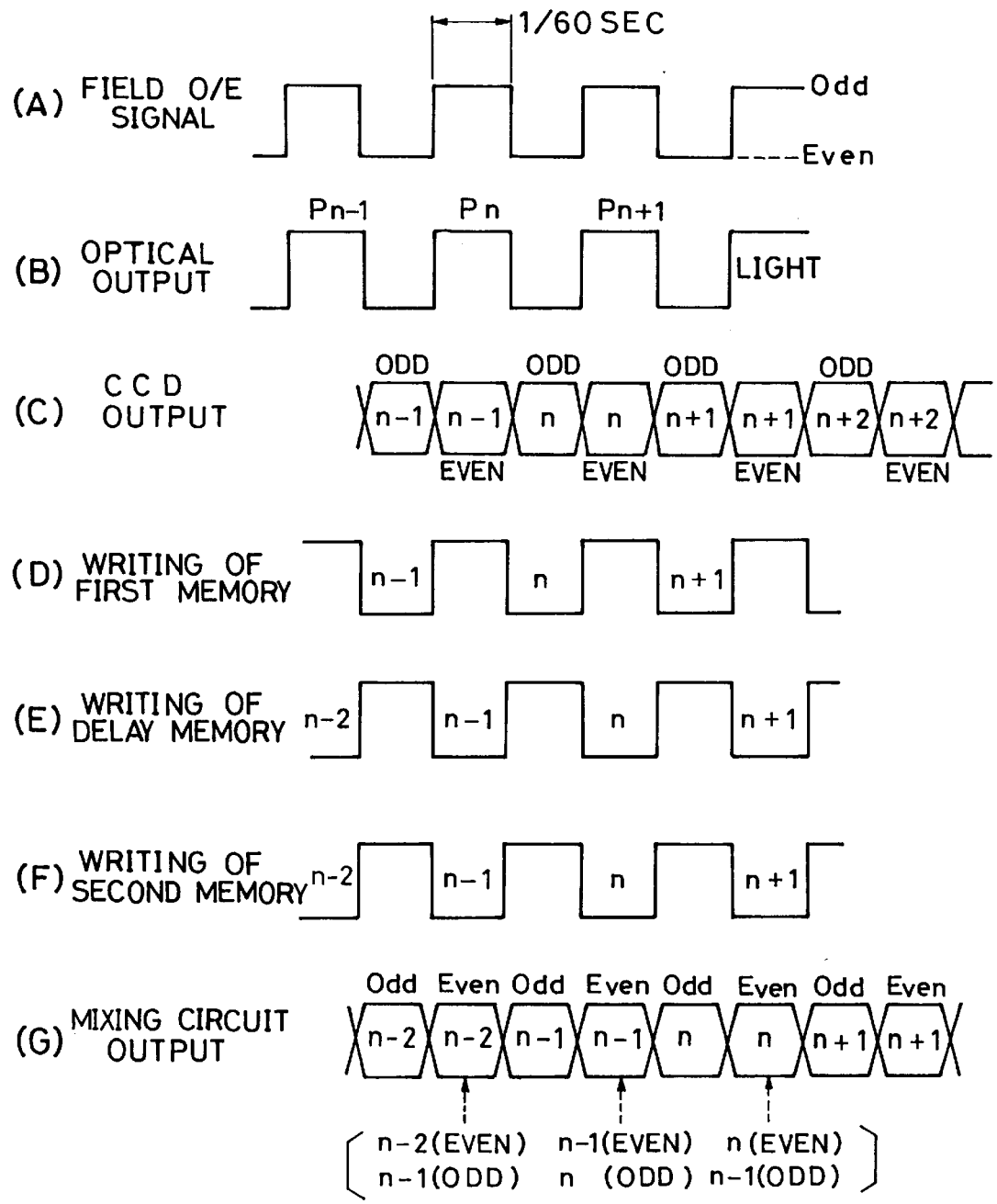
FIG. 6 is an explanatory view showing the main image forming operations of the second embodiment.

The second embodiment is comprised of the above construction, and its operation is described with reference to FIGS. 6 and 7. As shown in FIG. 6(A), as a field O (Odd)/E(Even) signal, a timing signal forming one field image in 1/60 sec is used. Further, by causing the light chopper 36 to make one turn in 1/30 sec correspondingly to this, a light is repetitively outputted with a 1/60 sec period while interlacing with light intercepted states of 1/60 sec, as shown by Pn−1, Pn, and Pn+1 in FIG. 6(B).

By the irradiation of light into the subject to be observed, charges corresponding to the image are stored in the CCD 15. Thereafter, through the control by a all pixels read pulse generator circuit 19, the stored data of the all pixels of the CCD 15 which was obtained by one exposure is read out. That is, as shown in FIG. 6 (C), based on the exposure to the optical output Pn−1 in FIG. 6(B), the odd (ODD) line data and even (EVEN) line data of n−1 are sequentially read out from the CCD 15, and the odd line data is stored in the first memory 122-1 by the write enable signal of FIG. 6(D), while the even line data is stored in the second memory 23 by the write enable signal of FIG. 6(F).

And, as to the odd line data in the above first memory 122-1, it is stored in the delay memory 122-2 by the same write enable signal as FIG. 6(F) which is lagging behind the signal of FIG. 6(D) by 1/60 sec, as shown in FIG. 6(E). In this way, the respective odd and even line data are read out in the order of the optical outputs Pn, Pn+1 . . . and written to the respective memories 122-1, 122-2, and 23. Such write/read control is performed by a memory control circuit 125 in FIG. 5.

Then, the data in the memories 122-2 and 23 are subjected to a pixel mixing by a mixing circuit 24, and as shown in FIG. 6(G), odd and even field signals are obtained based on the image data obtained in the same exposure, such as the odd (Odd) field signal and the even (Even) field signal obtained by the mixing process of a combination of the odd line data and even line data of the same n−2 (−th), and similarly, the Odd field signal and the Even field signal obtained by the mixing process of the line data of the same n−1.

Considering the case in which the delay memory 122-2 is not used, as shown below FIG. 6(G) (similar to the first embodiment) the mixing circuit 24 outputs signals including data in different exposures, for instance, next to the odd field signal obtained by the mixing process of the odd and even line data of the same n−2, the Even field signal obtained by the mixing process of a combination of the even line data of n−2 and the odd line data of n−1, and next to the Odd field signal obtained by the mixing process of the odd and even line data of the same n−1, an Even field signal obtained by the mixing process of a combination of the even line data of n−1 and the odd line data of n. Accordingly, in a field image or a frame image, the delay memory 122-2 of the present invention eliminates the state in which the data in different exposures as described above mixedly exist.

And, these field signals are subjected to a color image process, and outputted to the monitor through the third memory 29, the fourth memory 30, and the switching circuit 31, and an image display is provided by an interlaced scan. Accordingly, in the embodiment, motion pictures are displayed on the monitor based only on the all pixel data obtained in the same exposure, and thus a high-quality image can be obtained. Therefore, even if there is a shake of the endoscope itself or a movement of the subject in a 1/60 sec period, a clear image less affected by this can be observed.

Figure 7:
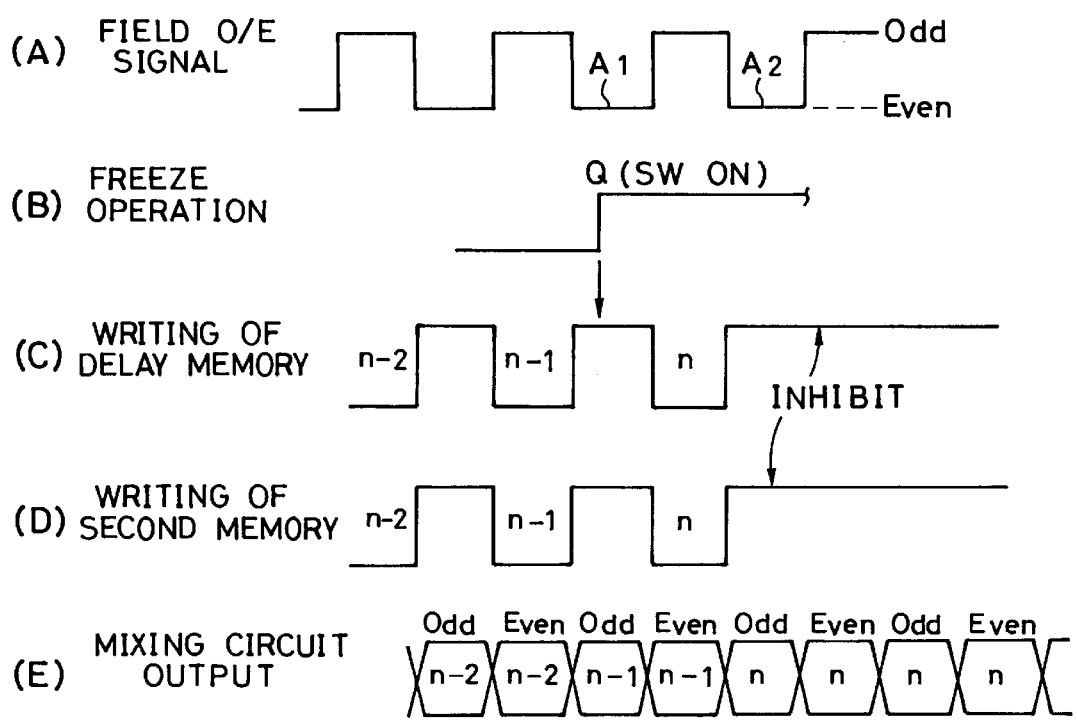
FIG. 7 is an explanatory view showing the operation for forming a freeze-frame image in the second embodiment.

FIG. 7 shows a freeze operation for forming a freeze-frame image, and in the memory control circuit 125 of FIG. 5, a control similar to the first embodiment is performed. For instance, if the freeze operation is turned on by the freeze switch 17 at the point of time Q shown in FIG. 7(B), the field O/E signal of FIG. 7(A) is at the fall (A1), and thus the writing to the delay memory 122-2 (or it may be the first memory) and the second memory 23 is inhibited at the next fall (A2) [FIG. 7(C), (D)].

Thus, to the delay memory 122-2, the odd line data of n obtained by the optical output Pn is written, and also to the other second memory 23, the even line data of n is written, and the writing of the next data is not performed. As a result, as shown in FIG. 7(E), only the odd (Odd)field signals and even (Even) field signals which are made up of the odd and even line data of the same n are continuously read out, and these field signals are displayed as a freeze-frame picture by an interlaced scan. By this, a clear image is also obtained for the freeze-frame picture based on the all pixel data in the same exposure.

Figure 8:
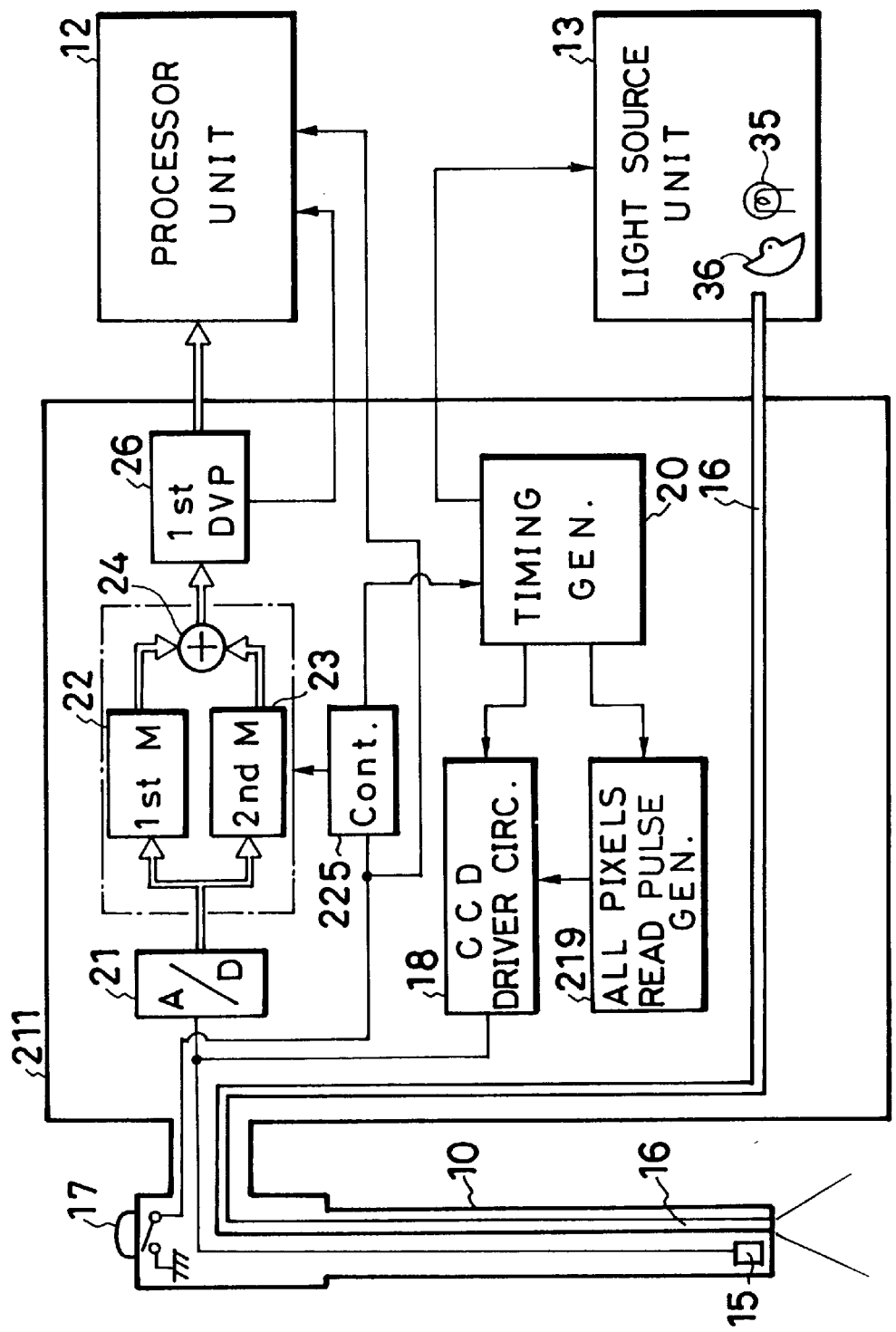
FIG. 8 is a block diagram showing the circuit construction of the all pixels read type electronic endoscope related to the third embodiment of the present invention.

As described above, in accordance with the second embodiment, since a control is performed so that odd and even line data are stored in the memories with the same timing while using the delay memory, an image for one frame can be formed only by the data in the same exposure, and thus a clear high-quality image can be obtained not only for the freeze-frame picture but also for the motion picture.
Third Embodiment FIG. 8 shows the circuit construction of the all pixels read type electronic endoscope system of the third embodiment, and the third embodiment is adapted to read out image data at a double speed. In FIG. 8, the basic construction of an electronic endoscope 10, a connector circuit 211, a processor unit 12, and a light source unit 13 is similar to the construction of the first embodiment. And, in the connector circuit 211, there are provided a CCD driver circuit 18 as well as an all pixels double-speed read pulse generator circuit 219 as a double-speed read control circuit. The all pixels double-speed read pulse generator circuit 219 generates a pulse based on the signal of a timing generator 20 for dividing the stored data for the all pixels stored in the CCD 15 by one exposure into those for odd lines and even lines and reading out the respective ones in $1/120$ sec, and supplies it to the CCD driver circuit 18. The CCD driver circuit 18 performs a control for independently sequentially reading out the odd line signal and even line signal from the CCD 15 based on the read pulse.

Further, there are provided an A/D converter 21, a first memory 22, a second memory 23, a mixing circuit 24, and a memory control circuit 225. That is, the respective writings to the memories 22 and 23 are performed in a $1/120$ sec period, but the subsequent reading is performed in $1/60$ sec, which is a vertical synchronizing period. And, the mixing circuit 24 adds and mixes the odd line data and the even line data.

Figure 9:
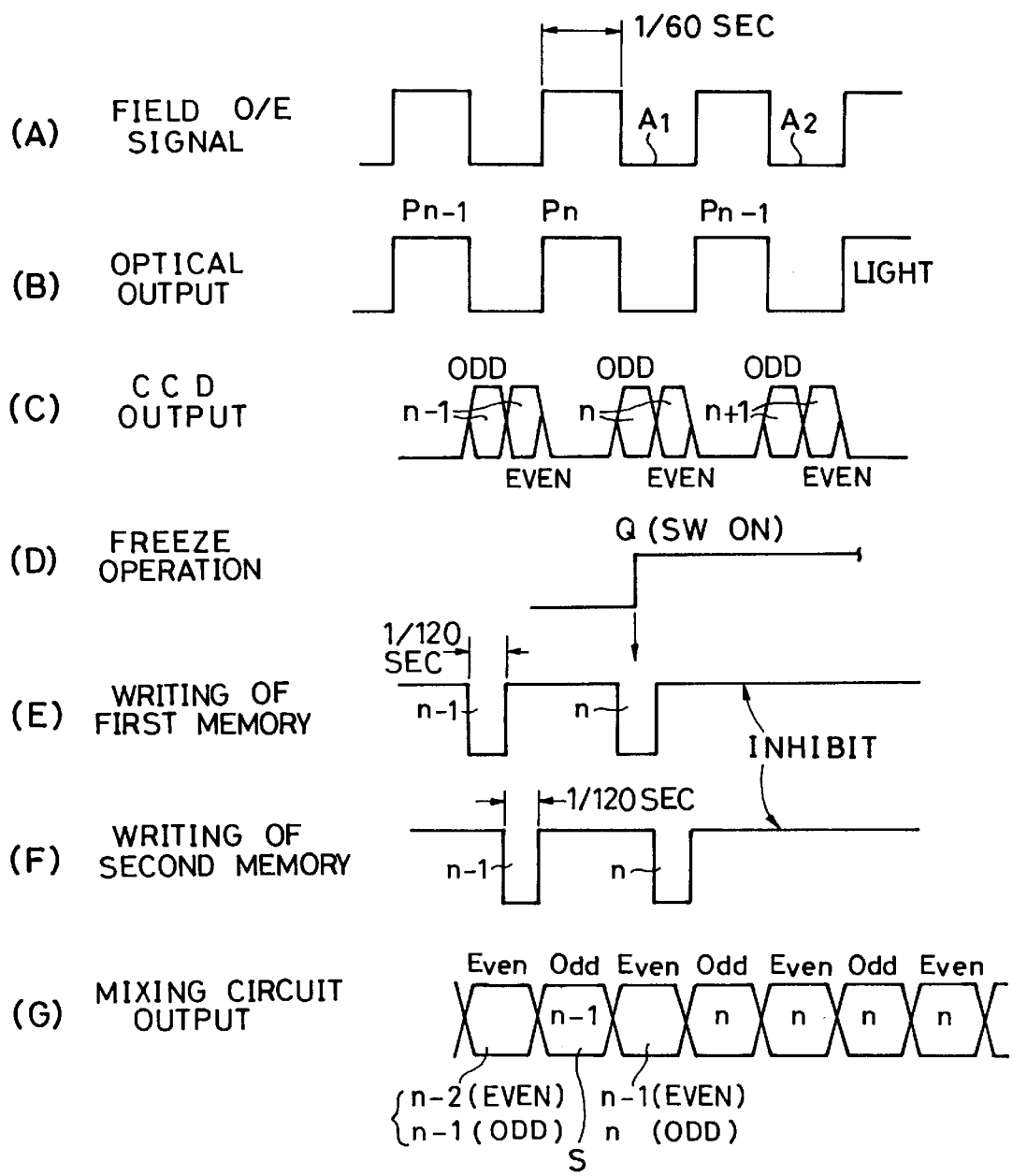
FIG. 9 is an explanatory view showing the main operations of the third embodiment.

This embodiment is comprised of the above construction, and its operation is described with reference to FIGS. 9 and 10. As shown in FIG. (A) and (B), light is repetitively outputted with $1/60$ sec periods while interlacing with light interception of $1/60$ sec. And, in the third embodiment, by the control of the all pixels double-speed read pulse generator circuit 219, the stored data of the all pixels of the CCD 15 which was obtained by one exposure is read out at a double speed. That is, as shown in FIG. 9(C), based on the exposure of an optical output Pn-1 in FIG. 9(B), the odd (ODD) line data and even (EVEN) line data of n-1 are sequentially read out from the CCD 15 at every $1/120$ sec during the next $1/60$ sec light interception period, and the odd line data is stored in the first memory 22 by the write enable signal of $1/120$ sec of FIG. 9(E), while the even line data is stored in the second memory 23 by the write enable signal of FIG. 9(F). Similarly, the respective odd and even line data are read out in the order of optical outputs Pn, Pn+1 . . . and stored in the respective memories 22 and 23.

Then, the data in the memories 22 and 23 are subjected to a pixel mixing by the mixing circuit 24, and as shown in FIG. 9(G), field signals are sequentially formed, such as an odd (Odd) field signal (S) obtained by the mixing process of a combination of the odd line data and even line data of the same n-1 (-th), an even (Even) field signal obtained by the mixing process of a combination of the even line data of n-1 and the odd line data of n, and an odd (Odd) field signal obtained by the mixing process of a combination of the odd line data and even line data of the same n. And, these field signals are subjected to a color image process and once stored in the third memory 29 and the fourth memory 30, and the outputs of the memories 29 and 30 are alternately provided to the monitor to give an image display by an interlaced scan.

Accordingly, in this embodiment, for a motion picture, an image including part of the image data obtained in the next exposure is displayed, but the amount of data is half of the total, and thus even if there is a shake or movement in a $1/60$ sec period, the effect of it is small.

On the other hand, for a freeze-frame picture, the image display is provided by using only the data in the same exposure, and by the memory control circuit 225 in FIG. 8, operation of inhibiting the writing for the freeze-frame picture is performed. For instance, if the freeze operation is turned on by the freeze switch 17 at the point of time Q shown in FIG. 9(D), the field O/E signal of FIG. 9(A) is at a fall (A1), and thus the write enabling of the first memory 22 and the second memory 23 is inhibited at the next fall (A2) [FIG. 9(E), (F)].

Accordingly, the data of n obtained by the optical output Pn is written to the first memory 22 and the second memory 23, and the writing of the next data is not performed. As a result, as shown in FIG. 9(G), the odd (Odd) field signals and even (Even) field signals made up only of the odd and even line data of the same n are sequentially read out, and these field signals are displayed as a freeze-frame picture by an interlaced scan.

Figure 10:
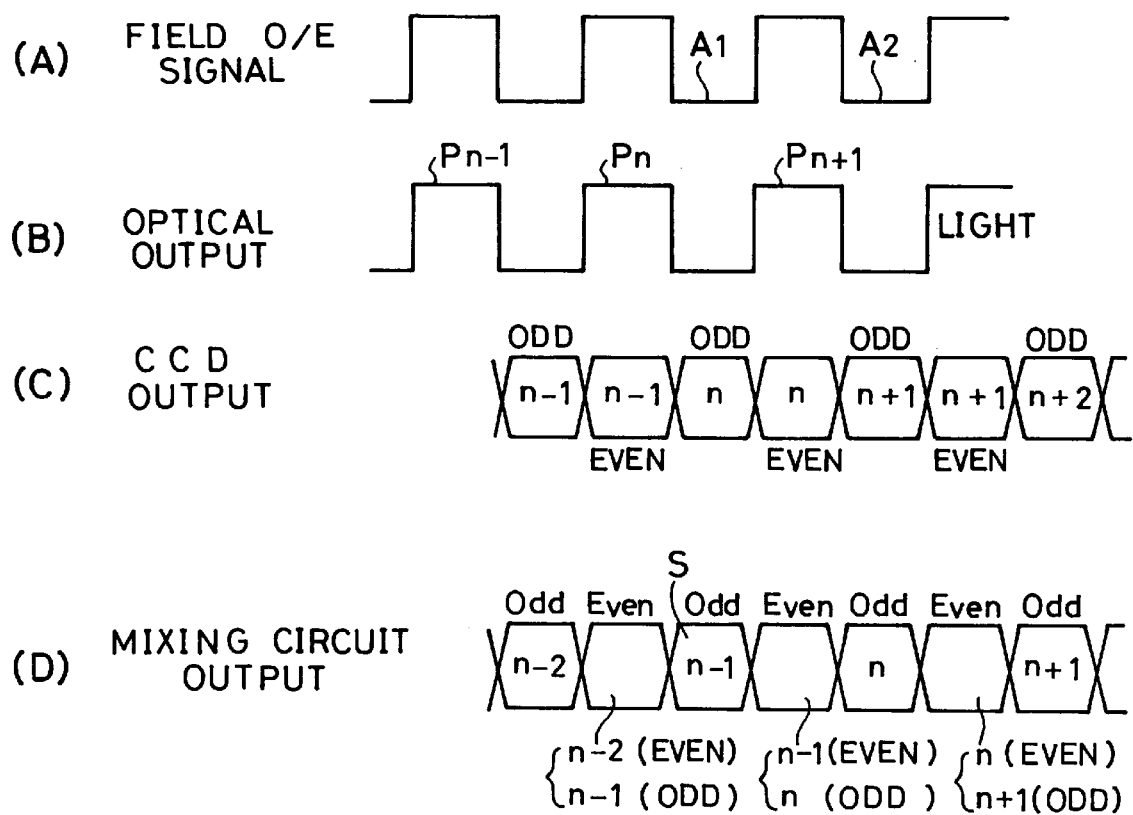
FIG. 10 is an explanatory view showing the operation for the case in which the double-speed reading is not performed in the system of FIG. 8.

FIG. 10 shows the signal output for the case in which the reading from the CCD 15 is performed at a speed similar to the prior art ($1/60$ sec) rather than the double speed, and in this case, the data shown in FIG. 10(C) are sequentially read out as explained in the above embodiments, and these odd and even line data are stored in the respective memories by a write enable signal of $1/60$ sec. And, from the mixing circuit 24, the field signal shown in FIG. 10(D) is outputted.

To compare this FIG. 10 with the above FIG. 9, it is seen that, for instance, the Odd field signal represented by a symbol S obtained by combining the line data of the same n-1 in FIG. 10(D) is formed at the position of the above A1 of the field O/E signal, but, in FIG. 9(G), the Odd field signal S obtained by combining the line data of the same n-1 is formed at a position earlier than the position of A1 of the above field O/E signal by $1/60$ sec. Accordingly, in this embodiment, the delay due to the storing in the memories 22 and 23 in the all pixels read method can be shortened by $1/60$ sec.

As described above, in accordance with the third embodiment, both image signals of odd and even lines are read out at a speed two times as fast as the memory read speed in a light interception period over which light is intercepted by the light intercepting means, and thus the delay of the image display due to storing in the memories can be improved by $1/60$ sec. Accordingly, there is an advantage that the time difference between the tip operation and the image display decreases and the delay of the display for the movement of the tip of the endoscope also decreases.
Fourth Embodiment In the fourth embodiment, as the all pixels read type electronic endoscope, the constructions of the above described first to third embodiments can be employed.

Figure 11A:
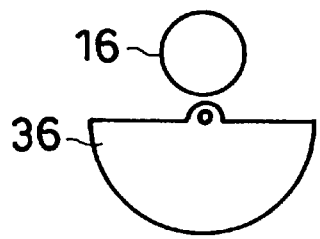
FIG. 11A is a figure showing the switching of the optical chopper.
Figure 11B:
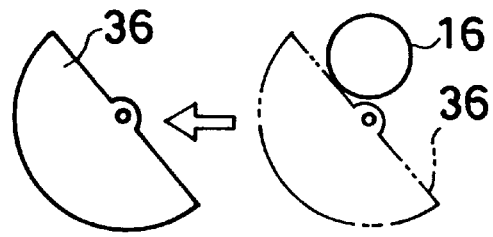
FIG. 11B is a figure showing another example of the switching structure of the optical chopper.

And, the light chopper 36 of the light source unit 13 in FIG. 1 can be switched to enable/disable by a switching means, and the switching to disable can be performed, for instance, by causing the semicircular plate of the light chopper 36 to stop at the lower position under control of the servo circuit 39, as shown in FIG. 11(A), whereby the light of the light source 35 is always supplied to the light guide 16. Further, the light chopper 36 may be switched to disable by laterally moving the light chopper 36 itself in the lateral direction with motion mechanism, as shown in FIG. 11(B).

Figure 13:
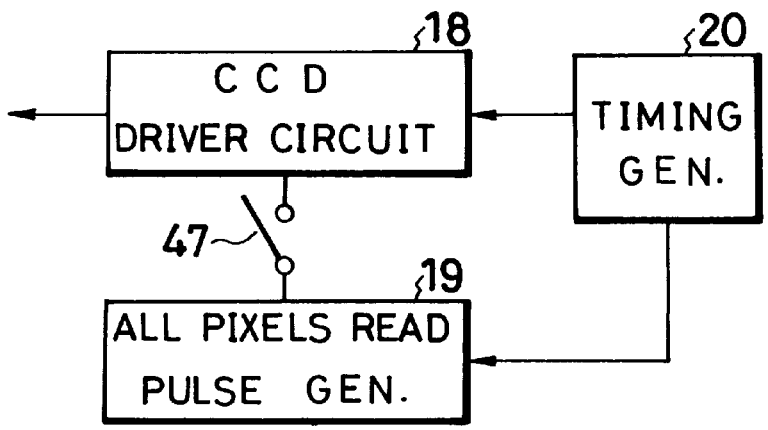
FIG. 13 is a block diagram showing the switching structure of the CCD driver unit.
Figure 14:
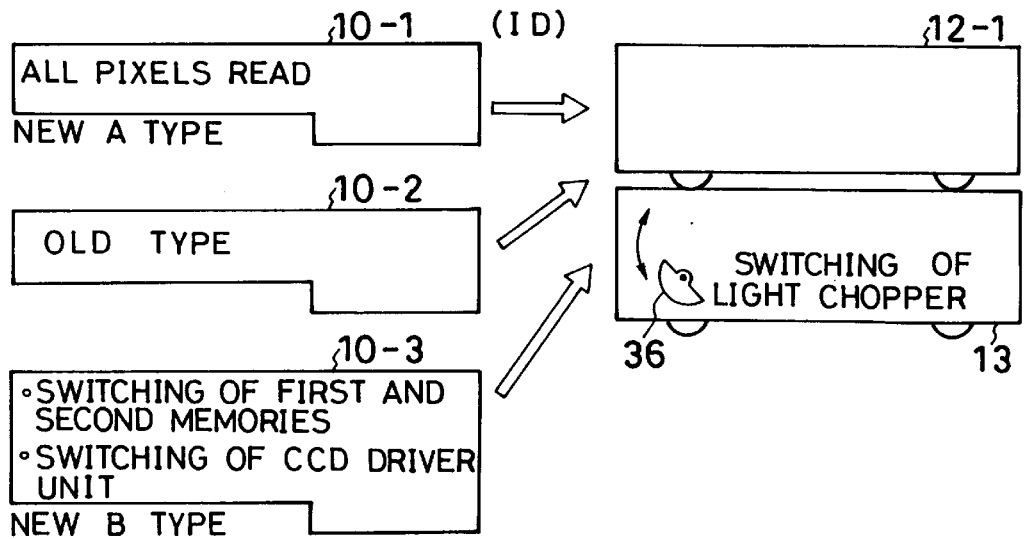
FIG. 14 is an explanatory view showing the combinations of the various electronic endoscopes which are made connectible in the case in which the switching structure of the optical chopper is employed.
Figure 15:
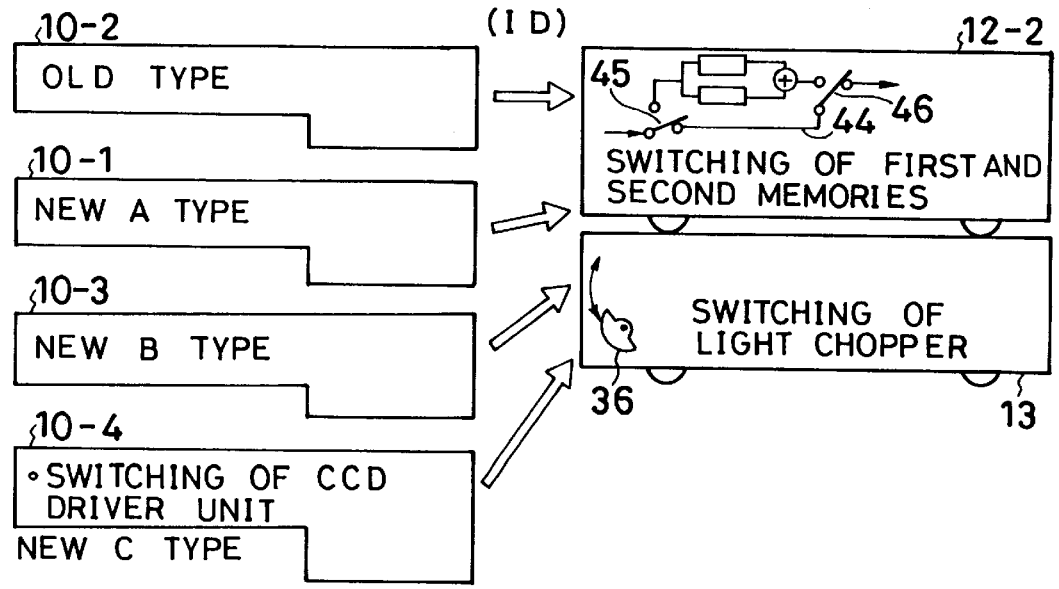
FIG. 15 is an explanatory view showing the combinations of the various electronic endoscopes which are made connectible in the case in which the switching structure of the first and second memory portions is employed in the processor unit.
Figure 16:
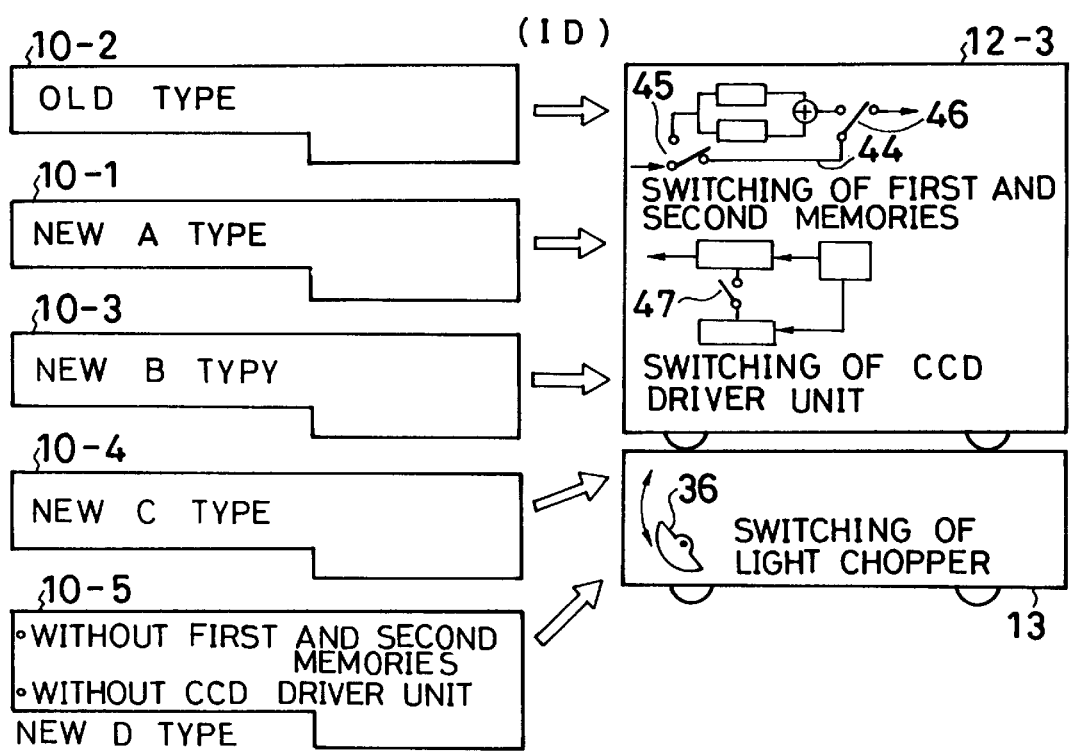
FIG. 16 is an explanatory view showing the combinations of the various electronic endoscopes which are made connectible in the case in which the switching structure of the CCD driver unit is employed in the processor unit.

FIGS. 14 to 16 show the patterns in which various electronic endoscopes are connected to the processor unit and the light source unit, and the system of FIG. 1 is a combination of a new A type electronic endoscope 10-1, a processor unit 12-1, and a light source 13 of FIG. 14. If the switching structure for enabling/disabling the light chopper 36 is provided, as in this light source unit 13, an old-type electronic endoscope 10-2, and a new B type electronic endoscope 10-3 comprising a structure for switching the first and second memories (FIG. 12) and a structure for switching the CCD driver unit (FIG. 13) can be connected.

Figure 17B:
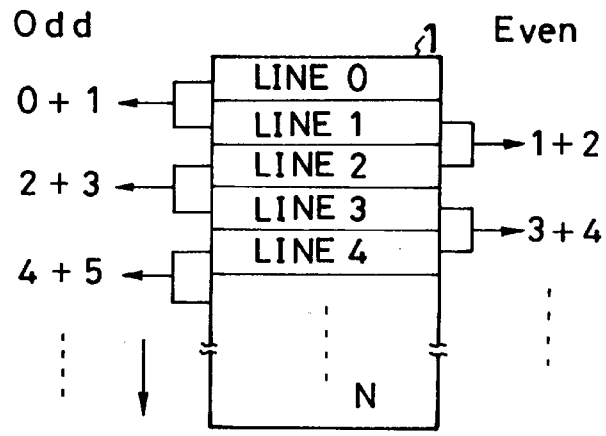
FIG. 17B is an explanatory view showing the mixed reading from the conventional CCD.
Figure 18:
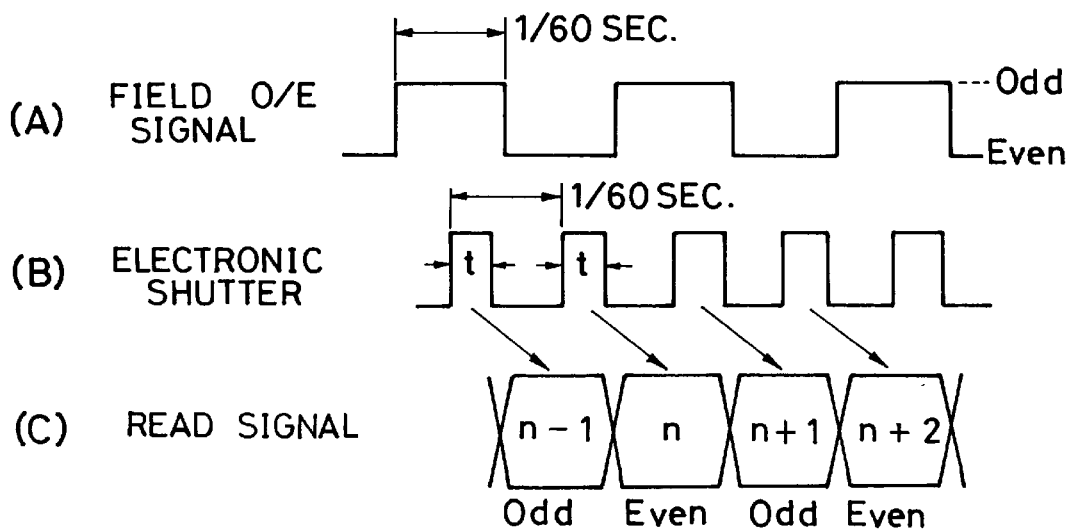
FIG. 18 is an explanatory view showing the operation in the conventional CCD.

That is, these electronic endoscopes 10-1, 10-2, and 10-3 are provided with identification information (ID information) by the structure of the connector unit or electrically, when these electronic endoscopes are connected to the respective units 12 and 13, the processor unit 12 determines the type of the electronic endoscope 10 and selects the use of the light chopper 36 as needed. If the old-type electronic endoscope 10-2 is connected, the light chopper 36 is disabled, and in the electronic endoscope 10-2, the pixel mix read shown in FIG. 17 is executed for the CCD to form an image of the old type.

Figure 12:
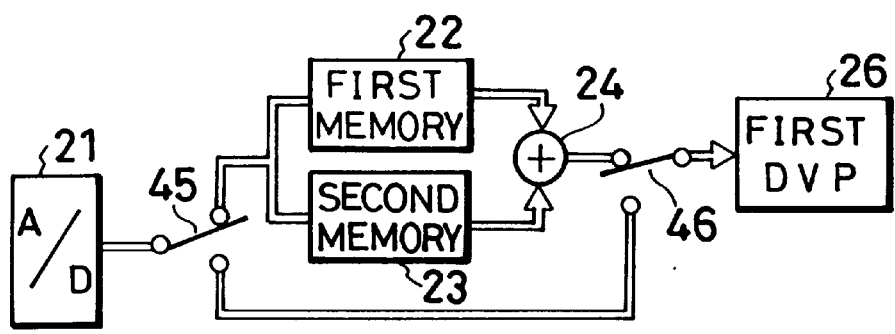
FIG. 12 is a block diagram showing the switching structure of the first and second memory portions.

FIG. 12 shows the structure for switching the first and second memories, and as shown, this switching structure comprises a through-line 44 for bypassing the first and second memories 22 and 23 and the mixing circuit 24, and switches 45 and 46. With this, the switches 45 and 46 can be controlled to select whether or not the first and second memories 22 and 23 and the mixing circuit 24 should be used, that is, whether or not the all pixels read processing should be performed.

FIG. 13 shows the structure for switching the CCD driver unit, and as shown, this switching structure comprises a switch 47 between the CCD driver circuit 18 and the all pixels read pulse generator circuit 19. With this, the switching of the switch 47 allows a selection to be made as to whether or not the all pixels read pulse generator circuit 19 should be used, that is, whether or not the all pixels read processing should be performed. Further, the CCD driver circuit 18 can perform the conventional read control by itself, and the circuit is constructed so that the all pixels read is executed if the all pixels read pulse generator circuit 19 is added.

And, as shown in FIG. 14, the new B type electronic endoscope 10-3 including the switching structures of FIGS. 12 and 13 is connected, the switching of the light chopper 36 allows the section of the new-type image processing and the old-type image processing in one electronic endoscope 10. This selection can be performed by a switch in the operation unit of the electronic endoscope 10 or the processor unit 12.

FIG. 15 shows the combinations available if the switching structure for the first and second memories of FIG. 12 is placed in a processor unit 12-2, and in this case, by performing a switching to use the through-line 44 (to disable the light chopper 36) in the processor unit 12-2, the old-type electronic endoscope 10-2 and the new A type electronic endoscope 10-1 can be connected. Further, the new B type electronic endoscope 10-3 and a new C type electronic endoscope 10-4 employing the switching structure for the CCD driver unit of FIG. 13 can also be connected, whereby the selection of the new-type image processing and the old-type image processing is allowed in one electronic endoscope 10.

FIG. 16 shows the combinations available in which both switching structures of FIGS. 12 and 13 are placed in a processor unit 12-3, and in this case, by performing a switching in a processor unit 12-3 to enable the through-line 44 and to disable the all pixels read pulse generator circuit 19, the old-type electronic endoscope 10-2 and the new A type electronic endoscope 10-1 can be connected. Further, the new B type electronic endoscope 10-3 and the new C type electronic endoscope 10-4 can also be connected, and in addition, a new D type electronic endoscope 10-5, which does not include the first and second memories (22, 23, 24) and the CCD driver unit (18, 19), can also be connected.

Further, also for the connections by the combinations in FIGS. 15 and 16, by providing identification information (ID information) by the structure of the connector unit or electrically, as described above, the type of the electronic endoscope 10 can be determined on the processor unit 12 side. Furthermore, instead of the determination of the type of the electronic endoscope 10 by identification information, the user may selectively set the type on the operation panel of the processor unit 12.

As described above, in accordance with the fourth embodiment, the electronic endoscope employing the all pixels read method can be used along with the conventional electronic endoscope, thereby to enable an easy-to-use electronic endoscope system to be obtained.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. An all pixels read type electronic endoscope system comprising:

an image pickup device;

an image pickup device driver circuit for performing a control so that, with respect to the image signals stored for each pixel by one exposure in the image pickup device, the image signals of either odd or even lines are read out first and then the image signals of the remaining lines are read out; and a light intercepting unit for intercepting the illumination light so as to prevent pixel signals from being stored in said image pickup device during a predetermined time period in which image signals are read out in the image pickup device driver circuit, whereby an image is formed by said image pickup device driver circuit based on the image signals obtained in the image pickup device.

2. An all pixels read type electronic endoscope system as set forth in claim 1, wherein image memories for storing said image signals of odd lines and said image signals of even lines which are obtained from said image pickup device, and when a freeze-frame image is formed, only the image signals of odd and even lines which are obtained in the same exposure are stored in said image memories.

3. An all pixels read type electronic endoscope system as set forth in claim 1, wherein, as said image pickup device driver circuit, a double speed read control circuit is provided for performing a driving so that, with respect to the image signals stored for each pixel by one exposure in said image pickup device, the image signals of either odd or even lines are read out first and then the image signals of the remaining lines are read out, and performing a control so that the reading of both image signals of odd and even lines is executed at a speed two times as fast as a memory reading speed within a light interception period in which light is intercepted by said light intercepting unit.

4. An electronic endoscope system as set forth in claim 3, wherein the processor unit includes:

memories for storing a image signals of odd lines and the image signals of even lines which are obtained from said image pickup device in the same exposure;

a mixing circuit for mixing said image signals of odd and even lines from said memories to form an odd field image and an even field image;

a through-line for outputting the input signals of said memories without passing through said mixing circuit; and a switching circuit for switching said memories and mixing circuit, whereby both the electronic endoscope employing the all pixels read method and the electronic endoscope of the conventional reading method are made connectable to the processor unit and the light source unit.

5. An electronic endoscope system as set forth in claim 3, wherein a processor unit includes:

an all pixels read control circuit for first reading out the image signals of either odd or even lines with respect to the image signals stored for each pixel by one exposure in said image pickup device, and then reading out the image signals of the remaining lines; and a switching circuit for switching the all pixels read control circuit and the conventional read circuit, whereby both the electronic endoscope employing said all pixels read method and the electronic endoscope of the conventional read method are made connectible to the processor unit and the light source unit.

6. An electronic endoscope system as set forth in claim 3, wherein identification information is provided to the various types of electronic endoscopes employing said all pixels read method and the conventional electronic endoscope, and the identification information is automatically recognized in a processor unit to execute a predetermined switching.

7. An all pixels read type electronic endoscope system comprising:

an image pickup device in which a plurality of color filters are arranged on a pixel basis;

an image pickup device driver circuit for performing a control so that, with respect to the image signals stored for each pixel by one exposure in the image pickup device, the image signals of either odd or even lines are read out first and then the image signals of the remaining lines are read out;

a light intercepting unit for intercepting the illumination light so as to prevent pixel signals from being stored in said image pickup device during a predetermined time period in which image signals are read out in the image pickup device driver circuit;

image memories for storing said image signals of odd lines and said image signals of even lines which are obtained from said image pickup device, and a mixing circuit for mixing said image signals of odd and even lines which are read out from the memories, thereby to form a simultaneous image signal, whereby a field image is formed based on the pixel mix signals outputted from the mixing circuit.

8. An all pixels read type electronic endoscope system as set forth in claim 2, wherein a delay memory is provided for delaying the image signals of even or odd lines, which are previously stored in said image memories, by a predetermined time, and in said mixing circuit, said image signals of odd and even lines in the same exposure, which are read from image memories and the delay memory are mixed together to form an image signal.

9. An electronic endoscope system in which a light source unit includes:

a light intercepting unit for intercepting the illumination light with a predetermined timing so as to prevent pixel signals from being stored in an image pickup device; and a switching unit for switching the enabling/disabling of the light intercepting unit, whereby an electronic endoscope employing the all pixels read method with respect to the image signals stored for each pixel by one exposure in said image pickup device, the image signals of either odd or even lines are read out first and then the image signals of the remaining lines are read out, and an electronic endoscope of the conventional reading method are both made connectible to a processor unit and the light source unit.

* * * * *